United States Patent
Morikuni et al.

(10) Patent No.: US 9,363,251 B2
(45) Date of Patent: Jun. 7, 2016

(54) SYSTEMS AND METHODS FOR CREDENTIAL MANAGEMENT BETWEEN ELECTRONIC DEVICES

(71) Applicant: Google Technology Holdings LLC, Mountain View, CA (US)

(72) Inventors: James Morikuni, Itasca, IL (US); Joseph M Hansen, Williams Bay, WI (US); Darren B Shu, Schaumburg, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 30 days.

(21) Appl. No.: 14/052,892

(22) Filed: Oct. 14, 2013

(65) Prior Publication Data
US 2015/0096001 A1    Apr. 2, 2015

Related U.S. Application Data

(60) Provisional application No. 61/885,207, filed on Oct. 1, 2013.

(51) Int. Cl.
*H04L 29/06* (2006.01)
*G06F 21/35* (2013.01)
*H04L 29/08* (2006.01)

(52) U.S. Cl.
CPC ............... *H04L 63/08* (2013.01); *G06F 21/35* (2013.01); *H04L 63/0853* (2013.01); *G06F 2221/2111* (2013.01); *H04L 67/02* (2013.01)

(58) Field of Classification Search
CPC ... G06F 21/31; G06F 17/30861; H04L 63/08; H04W 12/06
See application file for complete search history.

(56) References Cited

U.S. PATENT DOCUMENTS

| 7,251,827 B1 * | 7/2007 | Guo et al. ...................... 726/8 |
| 8,256,664 B1 | 9/2012 | Balfanz et al. |
| 8,321,922 B1 | 11/2012 | Lo et al. |
| 8,396,452 B1 * | 3/2013 | Matsuoka ............... G06F 21/35 455/410 |
| 8,402,362 B2 | 3/2013 | Boss et al. |

(Continued)

FOREIGN PATENT DOCUMENTS

| WO | WO/2009/101549 | 8/2009 |
| WO | WO/2013/089777 | 6/2013 |

OTHER PUBLICATIONS

Keeper Security, Inc., "Keeper® Password & Data Vault", https://play.google.com/store/apps/details?id=com.callpod.android_apps.keeper&hl=en, May 21, 2013, 2 pages.

(Continued)

*Primary Examiner* — Dao Ho
*Assistant Examiner* — Cheng-Feng Huang
(74) *Attorney, Agent, or Firm* — Byrne Poh LLP (57) ABSTRACT

Embodiments are provided for managing user credentials that enable access to secure websites. According to certain aspects, a browser device connects (230) to a website server that hosts a secure website. The browser device initiates (236) a credential request and enters (238) a discovery routine with a mobile device. After establishing (240) a secure channel with the mobile device, the browser device sends (248) an identification of the secure website to the mobile device, which identifies (250) corresponding user credentials and sends (252) the user credentials to the browser device. The browser device populates (254) a login page with the user credentials and accesses (256) the secure website.

13 Claims, 9 Drawing Sheets

(56) References Cited

U.S. PATENT DOCUMENTS

| | | | |
|---|---|---|---|
| 8,407,768 B1 | 3/2013 | Hayter | |
| 8,407,773 B1 | 3/2013 | Hayter | |
| 8,555,363 B2 | 10/2013 | Lo et al. | |
| 2002/0186249 A1* | 12/2002 | Lu et al. | 345/781 |
| 2007/0244831 A1* | 10/2007 | Kuo | 705/67 |
| 2007/0287438 A1* | 12/2007 | Hansen et al. | 455/417 |
| 2011/0153429 A1* | 6/2011 | Ullah | 705/14.64 |
| 2011/0219427 A1* | 9/2011 | Hito | G06F 21/00 726/3 |
| 2012/0089707 A1* | 4/2012 | Baba et al. | 709/220 |
| 2014/0026202 A1 | 1/2014 | Lo et al. | |
| 2014/0053078 A1 | 2/2014 | Kannan | |
| 2014/0253813 A1 | 9/2014 | Bakar | |
| 2014/0259047 A1 | 9/2014 | Bakar et al. | |

OTHER PUBLICATIONS

Arkami, Inc., "myIDkey", http://myidkey.com/, accessed May 10, 2013, 9 pages.

International Search Report and Written Opinion of the International Search Authority dated Jan. 8, 2015 in International Patent Application No. PCT/US2014/058399.

Mannan, M. and Van Oorschot, P.C., "Passwords for Both Mobile and Desktop Computers ObPwd for Firefox and Android", In ;login, vol. 37, No. 4, Aug. 2012, pp. 28-37.

* cited by examiner

SYSTEMS AND METHODS FOR CREDENTIAL MANAGEMENT BETWEEN ELECTRONIC DEVICES

CROSS REFERENCE TO RELATED APPLICATIONS

This application claims the benefit of U.S. Provisional Pat. Appln. No. 61/885,207 filed on Oct. 1, 2013, which is fully incorporated herein by reference.

FIELD

This application generally relates to credential management. In particular, the application relates to platforms and techniques for securely storing user credentials for secure websites and retrieving the credentials to enable access to the secure websites.

BACKGROUND

While some websites enable users to freely navigate without requiring the users to log into the websites, more secure websites require user credentials for access. For example, an online banking website may require a user to input a username and password in order to access his or her bank account information. Generally, for these credential-based websites, there exists a need for secure techniques to store user credentials, enable the user credentials to be accessible from any location or device, and enable the entry of the user credentials without third-party interception.

Existing credential management solutions fail to satisfy all of these requirements. For example, even though a portable device-based password manager securely stores credentials on a single device, these password managers still require users to manually enter a master password in order to gain access to the password vault, retrieve the desired credentials from the vault, and then enter the credentials into a browser. Third-party interception of such portable device-based password manager may occur using a key-stroke logger, someone looking over the user's shoulder, or other situations.

As another example of a device-based password manager, a browser-based password vault may avoid key-stroke logger interception but is only useful for the particular device on which the browser-based password vault is stored.

A web-based password manager can generally be used on any device with a network connection and thus is more portable than a browser-based password vault, but the user must trust the remote password vault's security and still avoid key-stroke loggers on the computer they are using.

Accordingly, there is an opportunity to implement embodiments for retrieving user credentials for secure websites from a password vault on a different device. Additionally, there is an opportunity to implement embodiments for securely populating the retrieved user credentials in a browser application to enable access to the secure websites.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

DETAILED DESCRIPTION

Embodiments as detailed herein enable secure credential management between multiple electronic devices. According to embodiments, a browser device can store and execute a browser application for accessing secure websites. Further, a separate mobile device can maintain a credential vault that securely manages user credentials needed to access the secure websites. A user can authenticate to both the browser device and the mobile device using various techniques, such as via a password entry or other type of sign-in. The user can utilize the browser application installed on the browser device to access a login page of a secure website that requires user credentials for access thereto, upon which the browser device can initiate a discovery procedure to locate or detect the mobile device. The browser device and the mobile device can establish a secure channel through which secure data may be communicated. Then, the mobile device can authenticate the browser device at an application layer.

After being authenticated to the mobile device at both a secure channel and an application layer, the browser device can send an identification of the secure website (e.g., a uniform resource locator (URL) or an Internet Protocol (IP) address) to the mobile device over the secure channel, and the mobile device can query its credential vault to retrieve the user credentials associated with the secure website. The mobile device can send the user credentials to the browser device, which can auto-fill the login page of the secure website with the user credentials and accordingly access the secure website.

The embodiments as discussed herein offer benefits to users by providing a secure means for credential management and use of the credentials. In particular, the embodiments enable the credentials to be stored on a single, secure device that itself may be protected by a master password. Further, the embodiments may avail the credentials from any location or device by storing the credentials in a credential vault on a portable or mobile device. Moreover, the embodiments enable entry of the credentials without the possibility of a third-party interception by masking the credentials using auto-fill operations. Note that the mobile device communication of credentials is with the browser device rather than a network server, and the password vault in the mobile device is not duplicated at a browser device or a network server. This allows the password vault to be stored securely at the mobile device, which promotes portable access through any browser device, and also enables the entry of user credentials without third-party interception. It should be appreciated that additional benefits and improvements may be realized by the embodiments.

Figure 1:
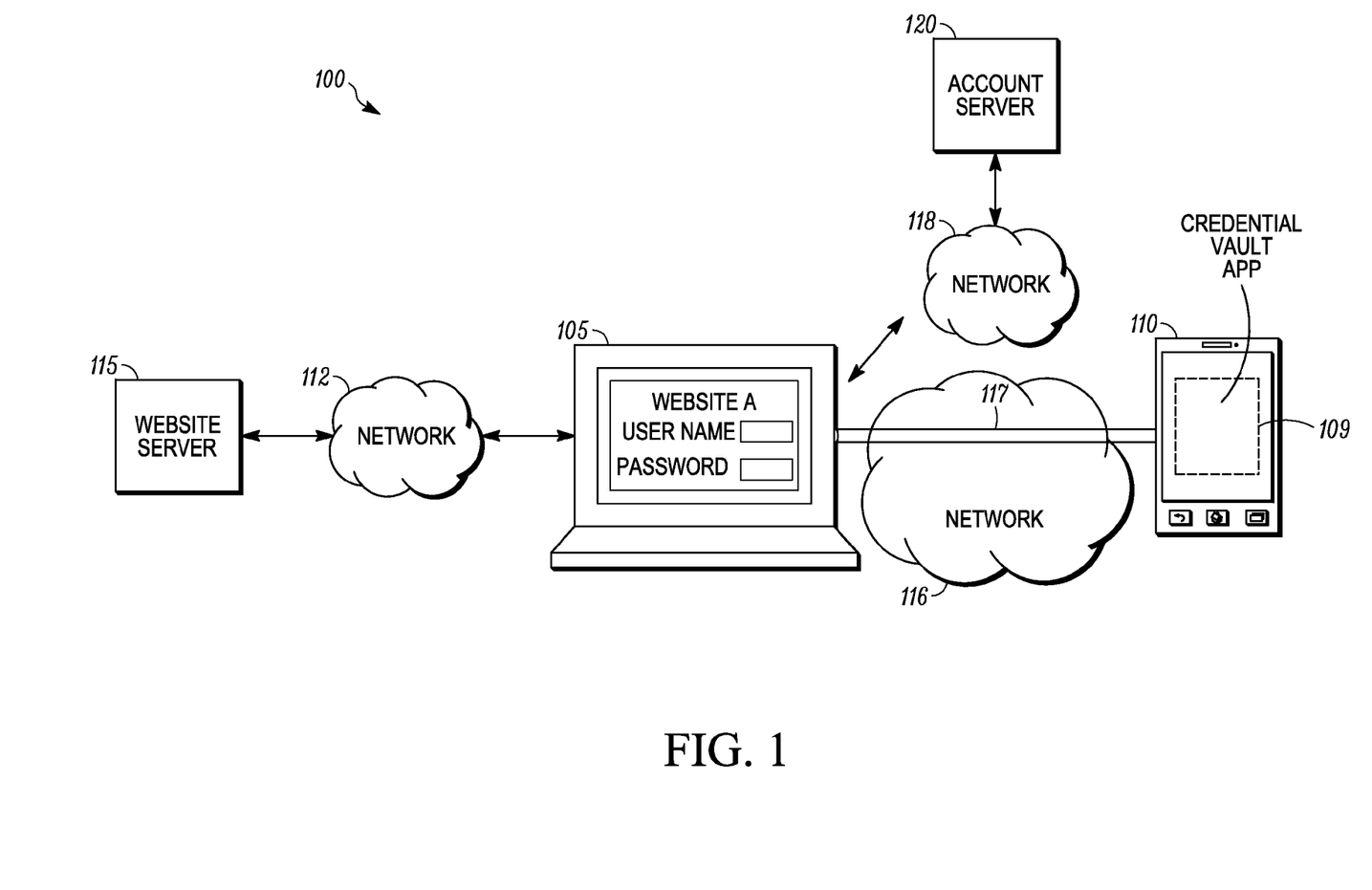
FIG. 1 depicts an example representation of electronic devices capable of storing and retrieving user credentials, and accessing websites using the user credentials, in accordance with some embodiments.

FIG. 1 is an example representation 100 of electronic devices and other components adapted to facilitate the credential management and retrieval techniques as discussed herein. As illustrated in FIG. 1, the representation 100 includes a browser device 105 and a separate mobile device 110. Although the browser device 105 is described as a "browser" device and the mobile device 110 is described as a "mobile" device, it should be appreciated that each of the browser device 105 and the mobile device 110 may be any type of standalone or portable electronic device, for example, a desktop or notebook computer, a mobile phone, a Personal Digital Assistant (PDA), a smart phone, a tablet computer, a multimedia player, an MP3 player, a digital broadcast receiver, a remote controller, or any other electronic apparatus.

The browser device 105 can be configured to connect to at least one website server 115 via a network 112 to access a website hosted or otherwise associated with the website server 115. In particular, the browser device 105 can execute a browser application (e.g., GOOGLE CHROME browser application, MOZILLA FIREFOX browser application, MICROSOFT'S INTERNET EXPLORER browser application, APPLE'S SAFARI browser application, or others) that can communicate with the website server 115 to access the website and facilitate navigation therethrough. The website associated with the website server 115 can be a secure website that requires user credentials for access thereto. It should be appreciated that various forms of user credentials are envisioned, such as a username and password pair, a PIN, biometric information, and others. According to embodiments, the mobile device 110 can store or otherwise maintain a credential vault application 109 or other type of credential manager application that stores and has access to user credentials for the website of the website server 115, and optionally user credentials for other websites. According to some embodiments, the credential vault application 109 can require user authentication (e.g., via a password entry) for access to the credentials stored thereon. As illustrated in FIG. 1, the browser device 105 can be configured to connect to the mobile device 110 via a second network 116 to facilitate retrieval of the user credentials for the website via a secure channel 117. The browser application of the browser device 105 can populate the login page (or other similar page) of the secure website with the retrieved user credentials and, using the user credentials, can then access or otherwise log into the secure website.

As further illustrated in FIG. 1, the browser device 105 can connect to an account server 120 via one or more networks 118 (which can be the same or different from the network 112). According to embodiments, the account server 120 can manage a browser account for the user of the browser device 105 and the browser application thereof. In operation, the user can sign into the browser application (e.g., the GOOGLE CHROME browser application) with his or her browser credentials, which the browser device 105 can reconcile with the browser account managed by the account server 120. If the user inputs correct browser credentials, the user can be deemed to be logged into the browser application of the browser device 105.

The networks 112, 118 as described herein can each be a wide area network (WAN) or a local area network (LAN), and the network 116 as described herein can be a personal area network (PAN). However, it should be appreciated that each of the network 112, the network 116, and the network 118 can be a WAN, LAN, PAN, or other network, and can facilitate any type of data communication via any standard or technology (e.g., GSM, CDMA, TDMA, WCDMA, LTE, EDGE, OFDM, GPRS, EV-DO, UWB, IEEE 802 including Ethernet, WIMAX, WIFI, BLUETOOTH, and others).

Figures 2, 2A:
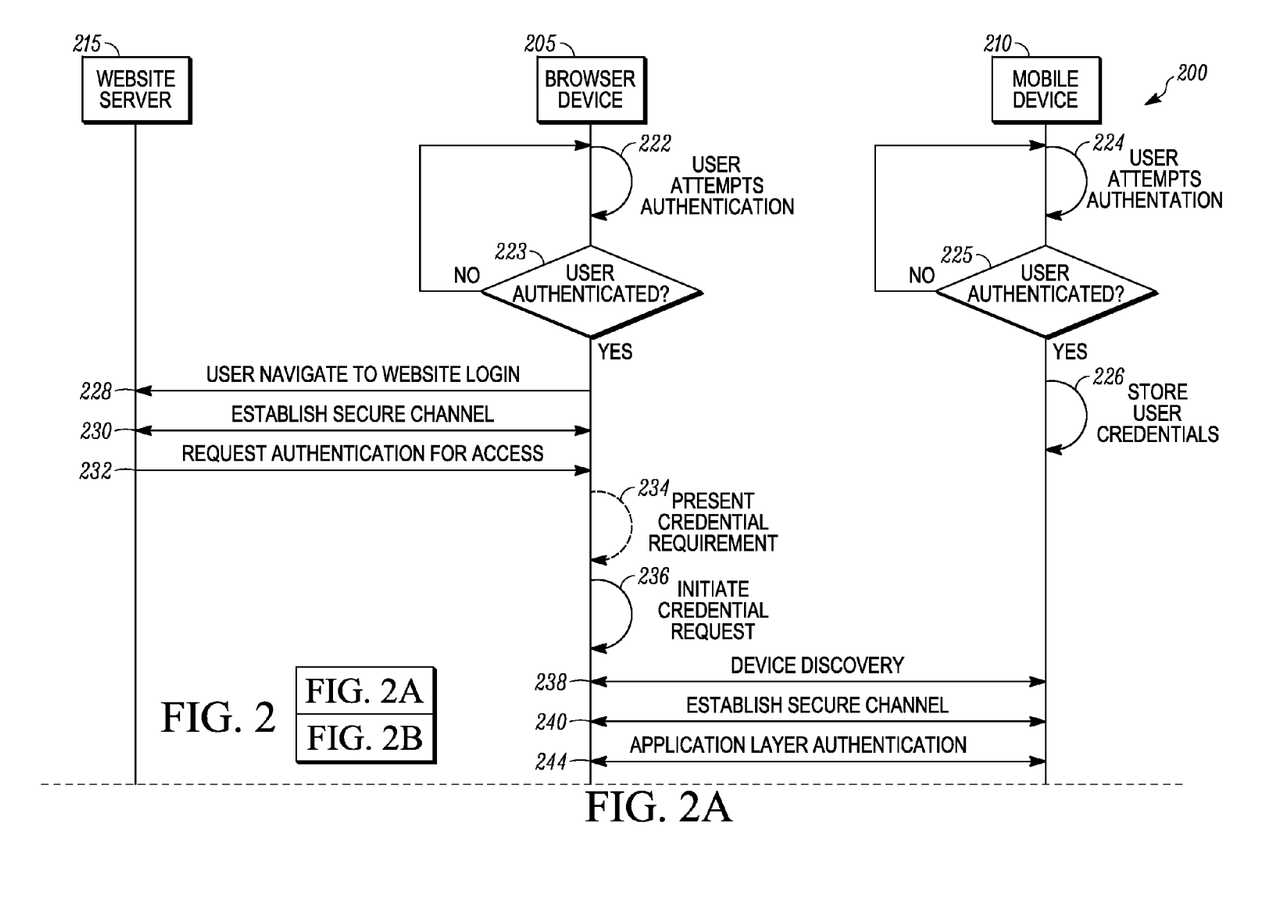
FIGS. 2A and 2B depict an example diagram associated with retrieving user credentials and accessing websites using the user credentials, in accordance with some embodiments.
Figure 2B:
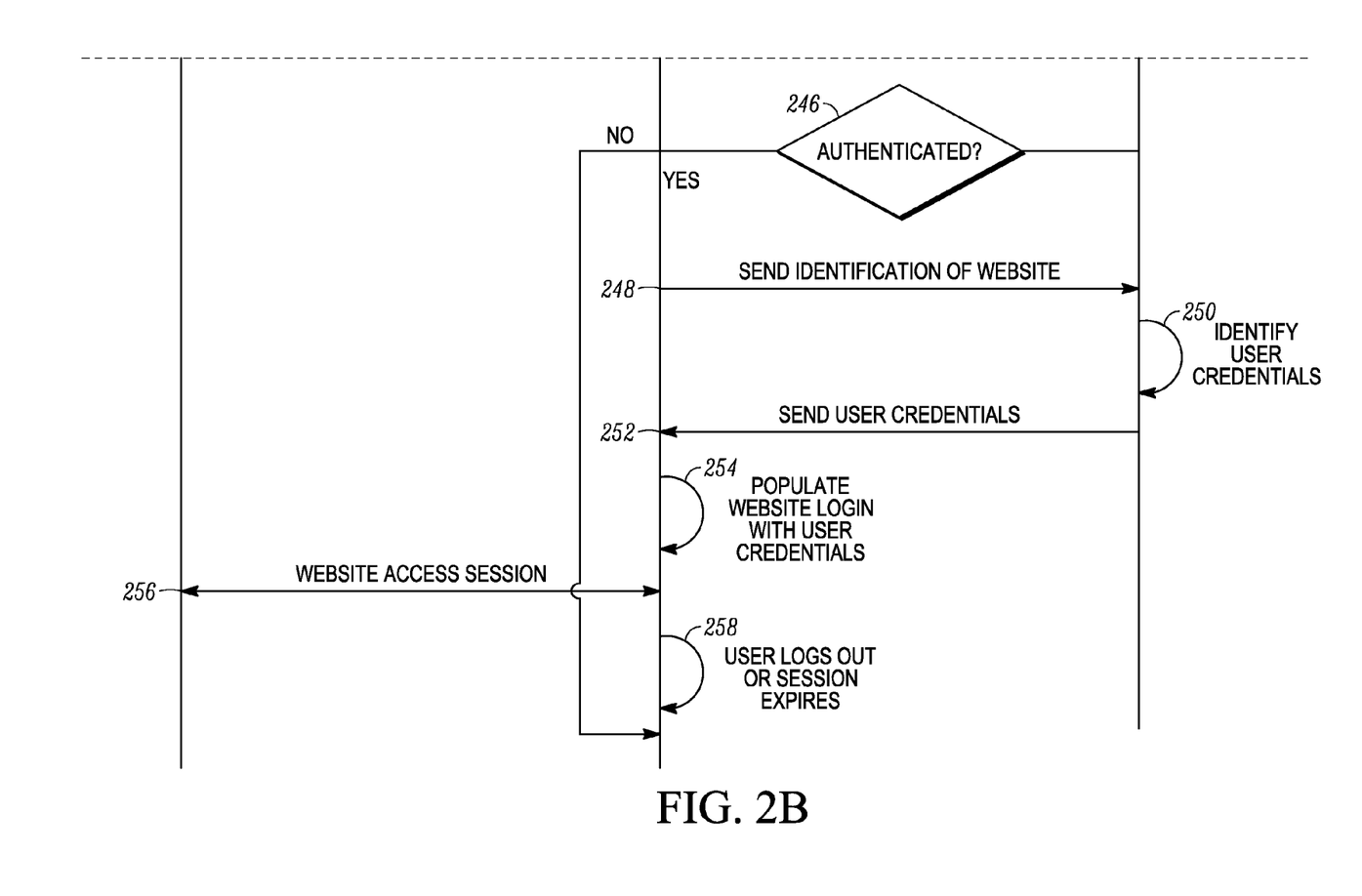

FIGS. 2A and 2B depict an example signaling diagram 200 associated with facilitating user credential retrieval and secure website access among a website server 215 (such as the website server 115 as discussed with respect to FIG. 1), a browser device 205 executing a browser application (such as the browser device 105 as discussed with respect to FIG. 1), and a mobile device 210 maintaining a credential manager application (such as the mobile device 110 as discussed with respect to FIG. 1).

The functionalities can begin with a user attempting authentication 222 to the browser device 205. According to embodiments, the user can attempt to authenticate to the browser device 205 via hardware techniques (e.g., a fingerprint scanner or other biometrics component on the browser device 205), a software mechanism such as a username/password entry on a lock screen, or other authentication techniques. In some cases, the user can log into the browser application using browser credentials, which a remote (i.e, "cloud") account server (such as the account server 120 as discussed with respect to FIG. 1) can reconcile with its stored account information for the user. The browser device 205 can determine 223 if the user is authenticated to the browser device 205 and/or to the browser application, such as by reconciling the inputted credentials. If the user is not authenticated ("NO"), processing can return to 222 or proceed to other processing. If the user is authenticated ("YES"), processing can proceed to 228 or to other processing.

The user can also attempt to authenticate 224 to the mobile device 210 and/or to the credential manager application stored thereon. In embodiments, the user can attempt to authenticate to the mobile device 210 and/or to the credential manager application via various hardware and/or software techniques such as PIN entry, biometrics scan, screen gesture, near field communication (NFC) connection, BLUETOOTH connection, or others. It should be appreciated that the user can authenticate to the mobile device 210 and to the browser device 205 in any order. The mobile device 205 can determine 225 if the user is authenticated to the mobile device 210 and/or to the credential manager application, such as by reconciling the inputted credentials. If the user is not authenticated ("NO"), processing can return to 224 or proceed to other processing. If the user is authenticated ("YES"), processing can proceed to 226 or to other processing. As illustrated in FIGS. 2A and 2B, in response to authenticating the user, the mobile device 210 can store 226 user credentials for one or more secure websites. In alternate embodiments, the mobile device 210 can obtain user credentials from other entities or via different techniques.

The user can use the browser application to navigate 228 to a secure website login, which prompts the browser device 205 to request the website server 215 for access to the secure website. According to embodiments, the browser device 205 can establish 230 a secure channel with the website server 215. It should be appreciated that various techniques for establishing a secure channel (i.e., "HTTPS") are envisioned, such as via the SSL/TLS protocol. The website server 215 can request 232 the browser device 205 for authentication to access to the secure website. In some cases, the browser device 205 can display a website login page that enables the user to enter user credentials (e.g., a username and password, or others) to access the secure website. In an optional embodiment, the browser device 205 can also present 234 a credential requirement indicator in a user interface, such as a symbol that represents the need for the user to input user credentials. For example, the credential requirement can be a lock symbol (and in particular, a lock symbol that is in addition to the conventional lock symbol used by some browser applications to denote a secure website connection), or other symbols. The browser device 205 can present the credential requirement indicator in a vicinity of an input area for the user credentials. It should be appreciated that various types of user credentials and credential requirement indicators are appreciated. In some embodiments, the browser device 205 can, at any point up to and after presenting the credential requirement indicator (processing 234), enable the user authentication attempt to the browser device 205 and/or to the browser application (processing 222) and determine if the user is authenticated to the browser device 205 and/or to the browser application (processing 223).

The browser device 205 can initiate 236 a credential request. In some cases, the user can select the credential request indication that is displayed in the user interface. In other cases, the browser device 205 can automatically initiate the credential request in response to receiving the authentication request from the website server 215. In further cases, the browser device 205 can receive a command (e.g., a hardware button selection, audio command, etc.) from the user, the mobile device 210, or other individual or entity, to initiate the credential request.

Responsive to the credential request initiation, the browser device 205 can enter 238 a device discovery routine with the mobile device 210. In embodiments, the browser device 205 can initiate various wired or wireless routines to discover the mobile device 210 such as BLUETOOTH, WIFI, audio tones or commands, NFC, graphics (e.g., QR codes or others), physical connection, or others. For example, the browser device 205 can output the audio command "OK Google Now, access user credentials," which the mobile device 210 can detect via a microphone. It should be appreciated that other device discovery routines are envisioned.

Responsive to detecting the mobile device 210, the browser device 205 can establish 240 a secure channel to the mobile device 210 via performing one or more authentication routines. In some embodiments, the authentication routine(s) may be one-way using, in some cases, various abstraction layers of the Open Systems Interconnection (OSI) model. For example, the browser device 205 can establish a secure channel to the mobile device 210 via a WEP/WPA WIFI authentication (i.e., the data link layer of the OSI model). For further example, the browser device 205 can establish a secure channel to the mobile device 210 via a virtual private network (VPN) (i.e., the network layer of the OSI model). In other embodiments, the authentication routine(s) may be mutual whereby the browser device 205 and the mobile device 210 establish a secure channel through SSL/TLS or other similar protocol (which, in some cases, is deemed the session layer of the OSI model). It should be appreciated that other techniques using other models (or other layers of the OSI model) to establish the secure channel are envisioned.

According to embodiments, the browser device 205 and the mobile device 205 can securely exchange information via the established secure channel such as the secure channel 117 shown in FIG. 1. In particular, the browser device 205 performs 244 an application layer authentication with the mobile device 210 whereby the browser application of the browser device 205 communicates with the credential manager application of the mobile device 210. In some embodiments, the credential manager application of the mobile device 210 can be provisioned with a modified (e.g., hashed) or unmodified version of the user's browser credentials for the browser application of the browser device 205. For example, the user can input the browser credentials into the mobile device 210 at step 226, and the mobile device 210 can perform a cryptographic operation such as to hash the browser credentials and store the hashed browser credentials in storage. The browser device 205 can send a message (e.g. "Hello") or other initialization data to the mobile device 210. Upon receipt of the message, the mobile device 210 can generate cryptographic data (e.g., a cryptographic nonce), store the cryptographic data, and send the cryptographic data to the browser device 205. The browser device 205 can manipulate (e.g., hash) the user's browser credentials with the cryptographic data from the mobile device 210 to produce a manipulated (e.g., hashed) value, and send the manipulated value to the mobile device 210. The mobile device 210 can compare the manipulated value to the modified (e.g., hashed) version of the user's browser credentials stored thereon to determine whether to authenticate the browser application. If the comparison results in a match, the browser application can be deemed to be authenticated to the credential manager application. It should be appreciated that other application level authentication protocols and routines are envisioned.

The browser device 205 (and/or the mobile device 210) can determine 246 if there has been an authentication (e.g., if the secure channel has been established and the browser application has authenticated to the credential manager application). If there has not been an authentication ("NO"), processing can end or proceed to other functionalities. If there has been an authentication ("YES"), the browser device 205 can send 248 an identification of the secure website to the mobile device 210. For example, the identification can be a uniform resource locator (URL), an IP address, or other type of identification. In some embodiments, the mobile device 210 can, at any point up to and after receiving the identification of the secure website (processing 248), enable the user authentication attempt to the mobile device 210 and/or to the credential manager application (processing 224) and determine if the user is authenticated to the mobile device 210 and/or to the credential manager application (processing 225).

The mobile device 210, and specifically the credential manager application thereof, can use the identification to identify 250 and retrieve user credentials for the secure website. It should be appreciated that various types of user credentials are envisioned, for example username and password, PIN, and/or others. The mobile device 210 can send 252 the user credentials to the browser device 205 via the established secure channel. The browser device 205 can automatically populate 254 the website login with the user credentials. In embodiments, the browser application can "auto-fill" the website login page with the user credentials using masked characters (e.g., "****"). The browser device 205 can access 256 the secure website (i.e., establish a session) using the user credentials and the user can navigate the secure website using the browser application as desired. In 258**, the user can log out of the secure website or otherwise the session can expire.

Figures 3, 3A:
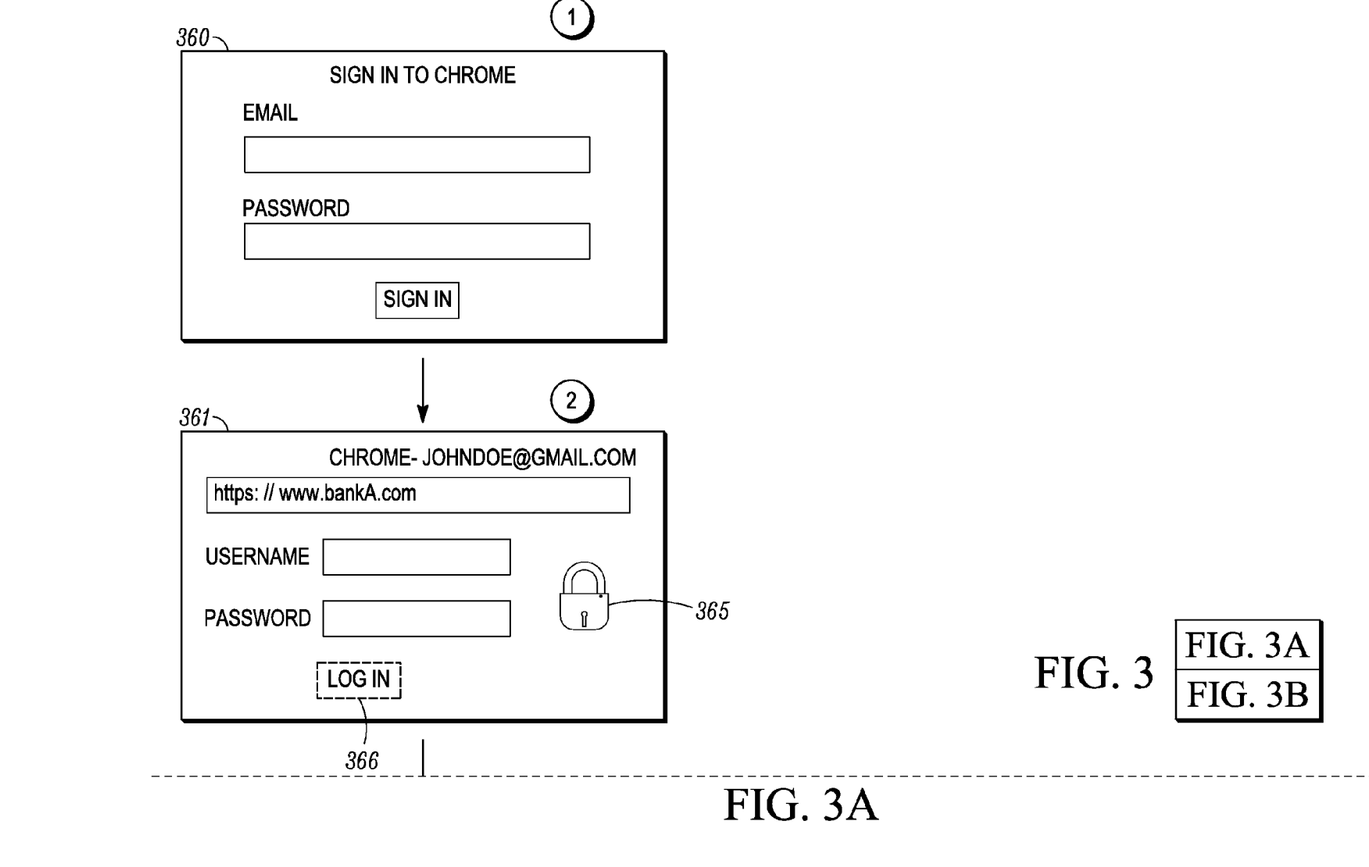
FIGS. 3A and 3B depicts example interfaces associated with retrieving user credentials and accessing websites using the user credentials, in accordance with some embodiments.
Figure 3B:
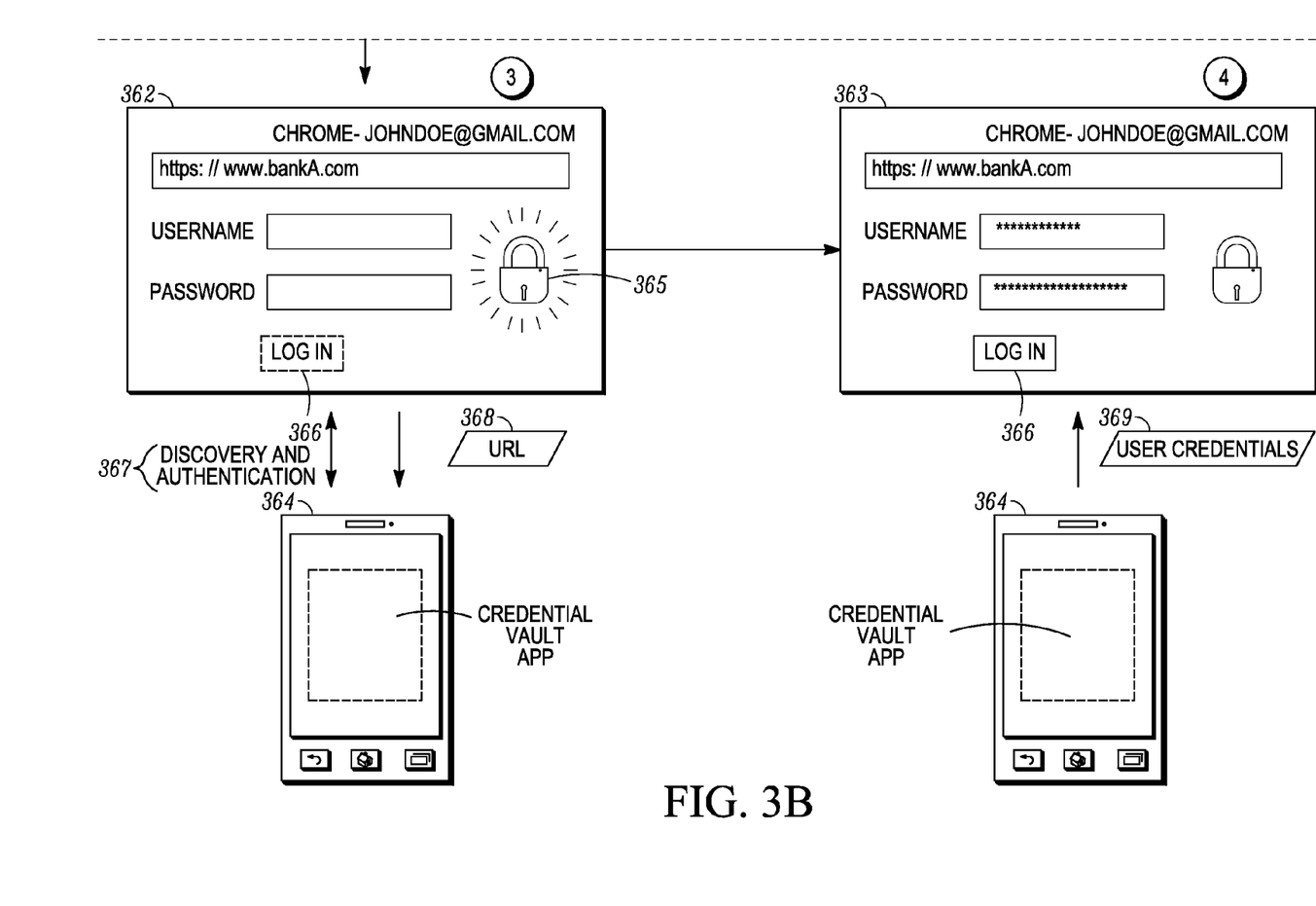

Referring to FIGS. 3A and 3B, depicted are example interfaces associated with the user credential retrieval techniques as discussed herein. A browser application operating on a browser device can display the example interfaces and enable a user to interact with the example interfaces.

As illustrated in FIGS. 3A and 3B, an example interface 360 enables a user to log into a browser application (as shown: the GOOGLE CHROME browser). In particular, the interface 360 enables the user to input browser credentials, such as an email (or other type of username) and password, and log into the browser application using the inputted browser credentials. In embodiments, the browser application can reconcile the inputted browser credentials with user account information stored on a remote server. After the user logs into the browser application, the browser application can display an interface 361 that enables the user to navigate to a secure website (as shown: www.bankA com). The browser application can attempt to access the secure website and can display a login page for the secure website as shown in the interface 361. As shown in FIG. 3A, the interface 361 includes a credential requirement indicator 365 that indicates a need for user credentials to access the secure website, as well as a login selection 366.

An interface 362 depicts a selection of the credential requirement indicator 365 which, when selected, can initiate a discovery and authentication routine (367) with a mobile device 364 and credential vault application thereof that stores the user credentials. It should be appreciated that other discovery routine triggers are appreciated, as discussed herein. In response to discovering the mobile device and authenticating (e.g., establishing a secure channel and performing an application-layer authentication) to the mobile device 364, the browser application can send an identification 368 (e.g., a URL) of the secure website to the mobile device 364. As depicted in an interface 363, the mobile device 364 can send user credentials 369 based on the identification 368 to the browser application. Responsive to receiving the user credentials 369, the browser application can populate the "username" and "password" fields with the user credentials 369, as shown in the interface 363 as masked characters. The browser application can enable a user to select the login selection 366 to initiate login to the secure website using the populated user credentials and enable navigation of the secure website.

Figure 4:
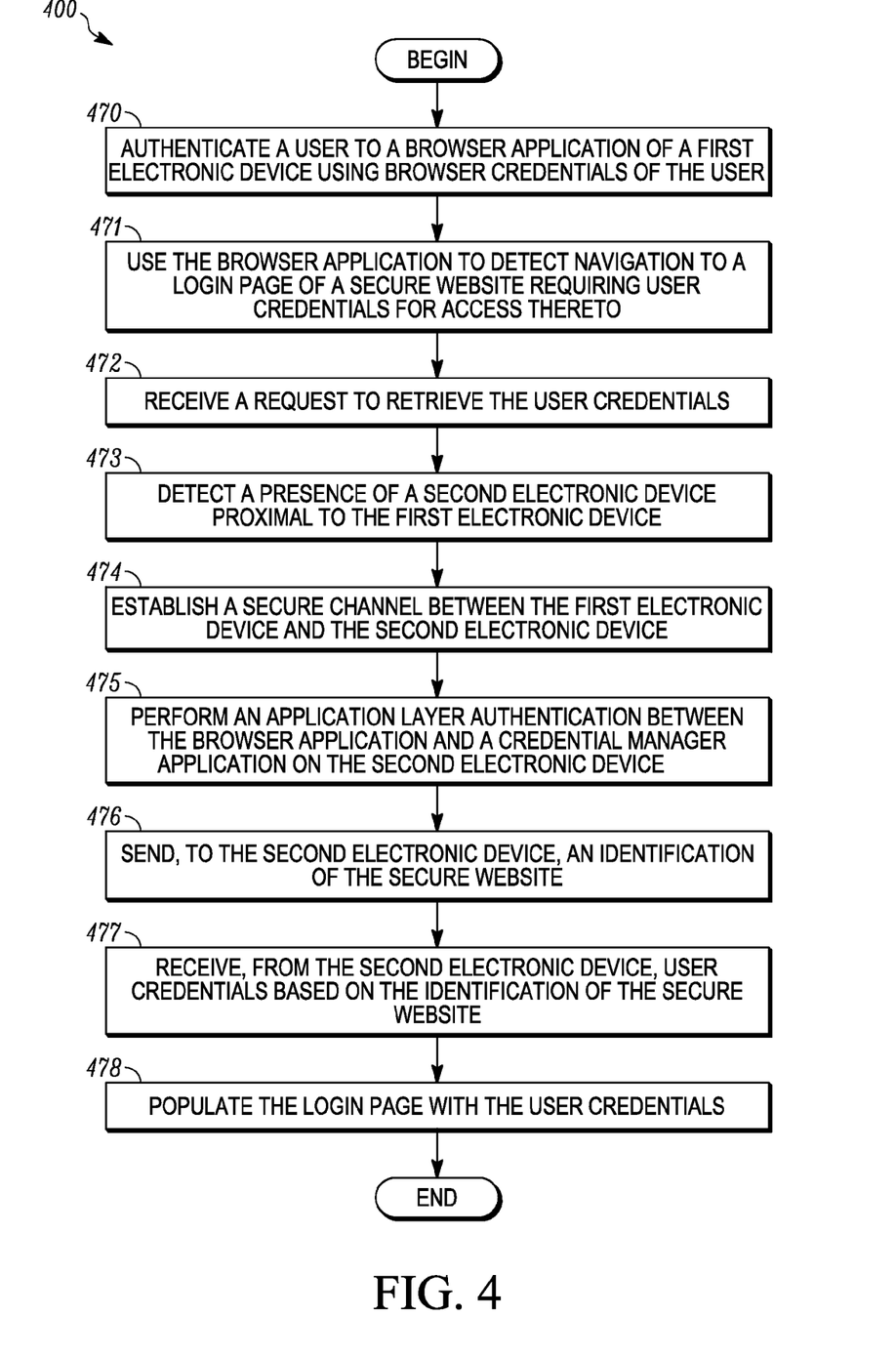
FIG. 4 depicts a flow diagram of retrieving user credentials and accessing websites using the user credentials, in accordance with some embodiments.

FIG. 4 is a flowchart of a method 400 for a first electronic device to enable a user to access a secure website. In this implementation, the first electronic device is a browser device such as browser device 105 shown in FIG. 1. The order of the steps of the depicted flowchart of FIG. 4 can differ from the version shown, and certain steps can be eliminated, and/or certain other ones can be added, depending upon the implementation. The method 400 begins with the first electronic device authenticating 470 a user to a browser application using browser credentials of the user. In particular, the user can log into the browser application using browser credentials that are reconciled with a copy of the browser credentials stored in the "cloud." In some embodiments, the user can authenticate to the first electronic device itself, such as via a hardware component (e.g., biometrics reader, NFC component, etc.), a software component (e.g., username/password, gesture, etc.), or other technique. As mentioned previously, authenticating the user to a browser may occur later, but at least before receiving 472 a request to retrieve user credentials as will be described later.

The first electronic device uses 471 the browser application to detect navigation to a login page of a secure website requiring user credentials for access thereto. The secure website can be hosted by a website server that causes the browser application to display a login page associated with the secure website. The first electronic device receives 472 a request to retrieve the user credentials. In some embodiments, the user can manually select an authentication request (e.g., a credential requirement indicator) displayed on the login page. In other embodiments, the website server can request the first electronic device to retrieve the user credentials. Further, the first electronic device may optionally perform the authentication processing (470) after receiving the request to retrieve the user credentials.

Responsive to receiving the request to retrieve the user credentials, the first electronic device detects 473 a presence of a second electronic device proximal to the first electronic device. In this embodiment, the second electronic device is a mobile device such as mobile device 110 shown in FIG. 1. In some embodiments, the first electronic device can output an audio command that is detected by the second electronic device. In other embodiments, the first electronic device can initiate a discovery routine to detect the second electronic device, such as via BLUETOOTH,WIFI, graphic detection (e.g., QR code), or other techniques. The first electronic device establishes 474 a secure channel to the second electronic device. In embodiments, the secure channel may be established via one-way authentication or mutual authentication using various layers of the OSI model or other protocols or techniques, as discussed herein.

The first electronic device performs 475 an application layer authentication between the browser application and a credential manager application on the second application device. In some cases, the application layer authentication may be facilitated using a SSL/TLS handshaking scheme. In other cases, the application layer authentication may be facilitated using hashing techniques as discussed herein. After successful secure channel establishment and application authentication, the first application sends 476, to the second electronic device, an identification of the secure website. The identification can be a URL of the secure website, an IP address of the secure website, or other identifications.

The first electronic device receives 477, from the second electronic device, user credentials based on the identification of the secure website. According to embodiments, the user credentials can be encrypted with the session key established in 475. The first electronic device automatically populates 478 the login page with the user credentials received from the second electronic device and uses the populated user credentials to access the secure website.

Figure 5:
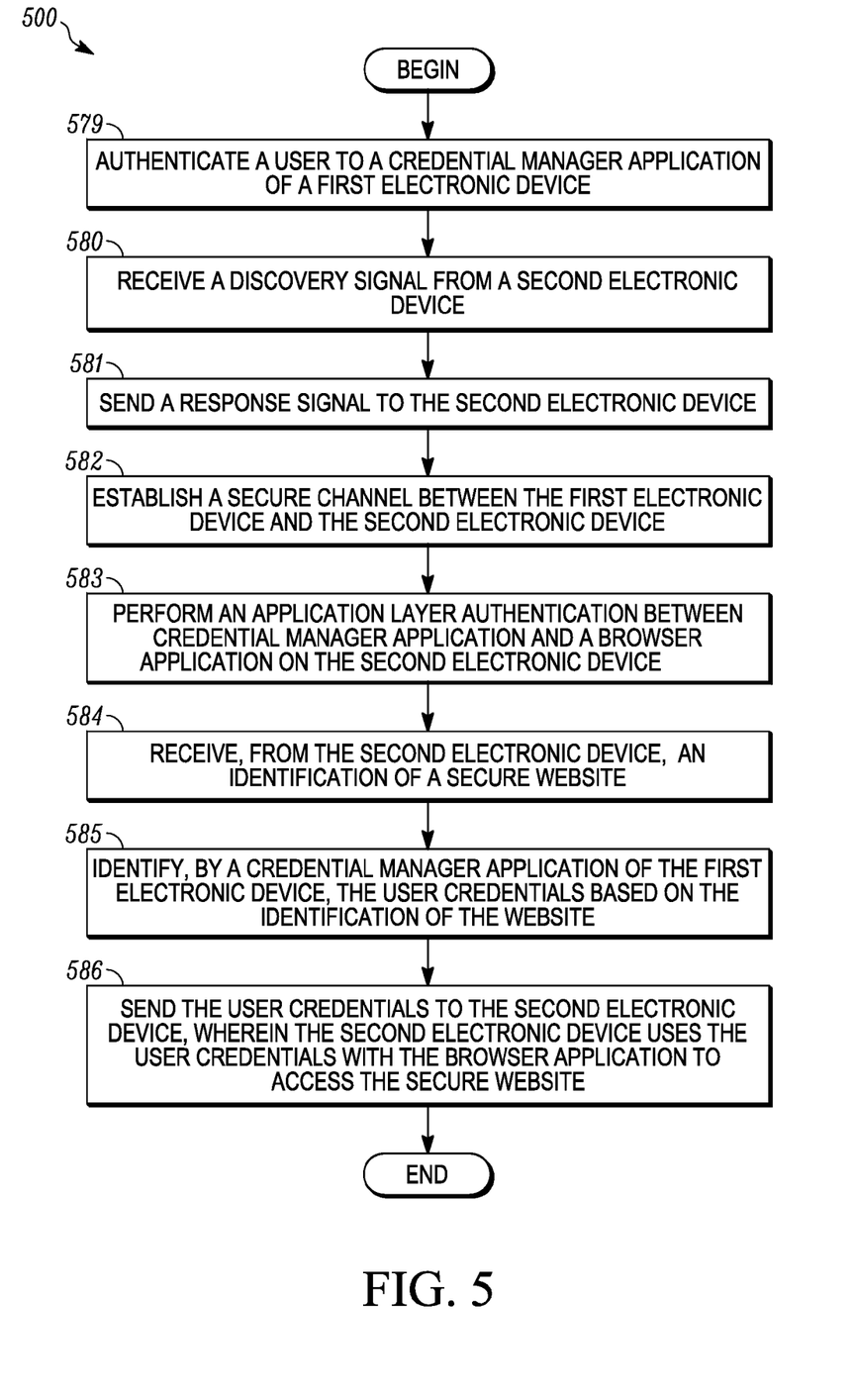
FIG. 5 depicts a flow diagram of providing user credentials for access to secure websites, in accordance with some embodiments.

FIG. 5 is a flowchart of a method 500 for a first electronic device to provide user credentials for access to a secure website. In this embodiment, the first electronic device is a mobile device such as mobile device 110 shown in FIG. 1. The order of the steps of the depicted flowchart of FIG. 5 can differ from the version shown, and certain steps can be eliminated, and/or certain other ones can be added, depending upon the implementation. The method 500 begins with the first electronic device authenticating 579 a user to a credential manager application stored on the first electronic device. In embodiments, the first electronic device can facilitate the authentication via a PIN entry, a gesture detection, an NFC connection, or other techniques. As mentioned previously, authenticating the user to a credential manager of the first electronic device may occur later, but at least before identifying 585 user credentials as will be described later.

The first electronic device receives 580 a discovery signal from a second electronic device (e.g., a browser device). The discovery signal may be received via a BLUETOOTH, WIFI, or other connection, or may be received as an audio tone or command. The first electronic device sends 581 a response signal to the second electronic device to acknowledge receipt of the discovery signal. The first electronic device establishes 582 a secure channel to the second electronic device. In embodiments, the secure channel may be established via one-way authentication or mutual authentication using various layers of the OSI model or other protocols or techniques, as discussed herein.

The first electronic device performs 583 an application layer authentication between the credential manager application and a browser application on the second application device. In some cases, the application layer authentication may be facilitated using a SSL/TLS handshaking scheme. In other cases, the application layer authentication may be facilitated using hashing techniques as discussed herein. The first electronic device receives 584, from the second electronic device, an identification of a secure website that a user of the second electronic device is attempting to access. In embodiments, the identification can be a URL or an IP address of the secure website. In some cases, the first electronic device may optionally perform the authentication processing (579) after receiving the identification of the secure website.

The first electronic device uses the credential manager application to identify 585 the user credentials based on the identification of the website. Further, the first electronic device sends 586 the user credentials to the second electronic device, wherein the second electronic device uses the user credentials with the browser application to populate a login page and to access the secure website.

Figure 6:
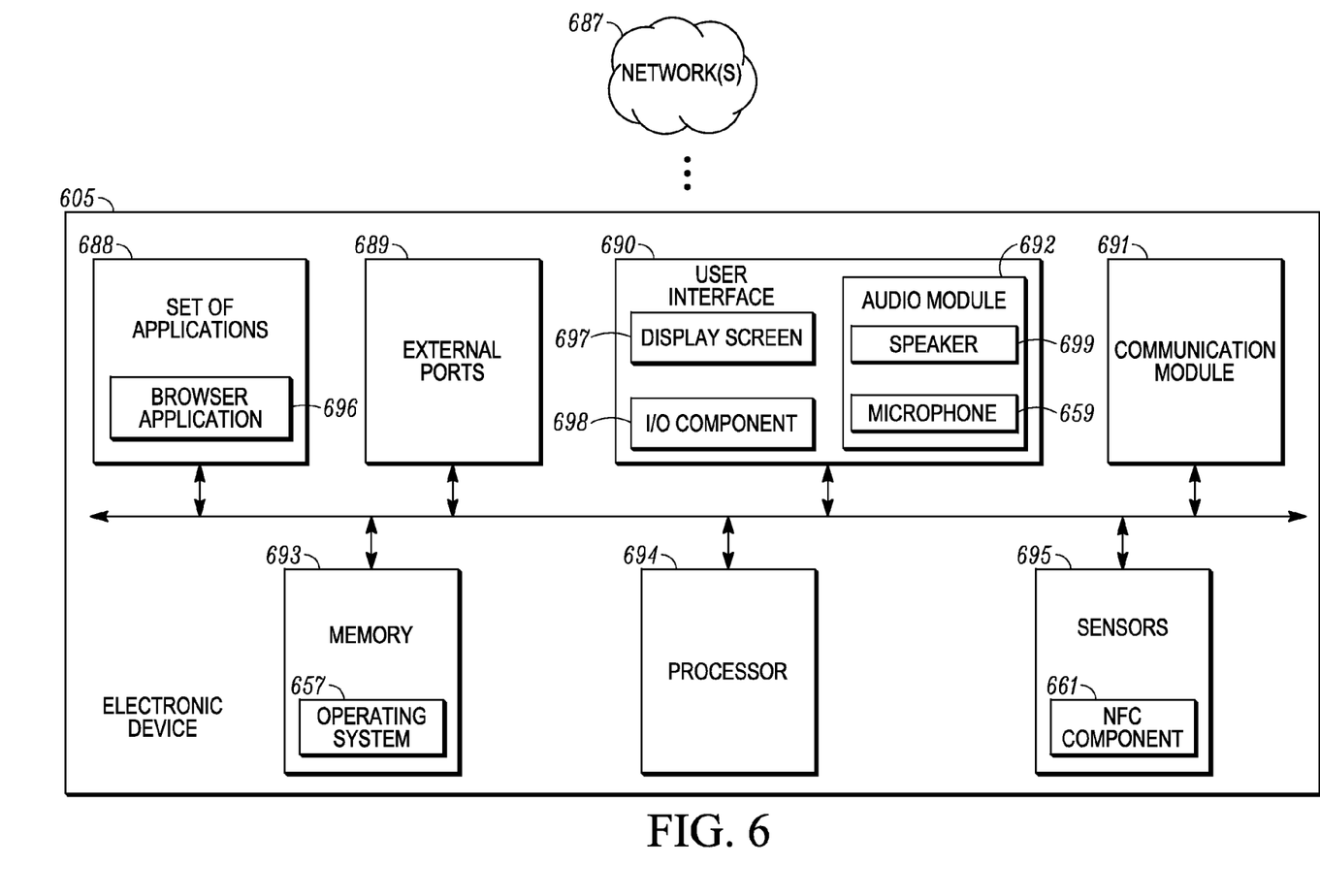
FIGS. 6 and 7 are block diagrams of electronic devices in accordance with some embodiments.

FIG. 6 illustrates an example electronic device 605 (such as the browser device 105 as discussed with respect to FIG. 1, or other devices) in which the functionalities as discussed herein may be implemented. The electronic device 605 can include a processor 694 or other similar type of controller module or microcontroller, as well as a memory 693. The memory 693 can store an operating system 657 capable of facilitating the functionalities as discussed herein. The processor 694 can interface with the memory 693 to execute the operating system 657, as well as execute a set of applications 688 such as a browser application 696 (which the memory 693 can also store). The memory 693 can include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 605 can further include a communication module 691 configured to interface with the one or more external ports 689 to communicate data via one or more networks 687. For example, the communication module 691 can leverage the external ports 689 to establish a personal area network and secure channels associated therewith for connecting the electronic device 605 to other electronic devices such as one shown in FIG. 7. According to some embodiments, the communication module 691 can include one or more transceivers functioning in accordance with IEEE standards, 3GPP standards, or other standards, and configured to receive and transmit data via the one or more external ports 689. More particularly, the communication module 691 can include one or more WWAN transceivers configured to communicate with a wide area network including one or more cell sites, base stations, and/or servers to communicatively connect the electronic device 605 to additional devices or components. For example, the transceiver can receive website data from a website via the network 687. Further, the communication module 691 can include one or more WLAN and/or WPAN transceivers configured to connect the electronic device 605 to local area networks and/or personal area networks, such as a Bluetooth® network. For example, the electronic device 605 can connect to a credential manager application of a remote electronic device via a personal area network.

The electronic device 605 can further include one or more sensors 695 such as, for example, imaging sensors, accelerometers, touch sensors, and other sensors, as well as NFC components 661 such as an NFC chip and/or an NFC tag for pairing the electronic device 605 with one or more other electronic devices.... The electronic device 605 may include a user interface 690 to present information to the user and/or receive inputs from the user. As shown in FIG. 6, the user interface 690 includes a display screen 697 and I/O components 698 (e.g., capacitive or resistive touch sensitive input panels, keys, buttons, lights, LEDs, cursor control devices, haptic devices, and others). In embodiments, the display screen 697 is a touchscreen display using singular or combinations of display technologies and can include a thin, transparent touch sensor component superimposed upon a display section that is viewable by a user. For example, such displays include capacitive displays, resistive displays, surface acoustic wave (SAW) displays, optical imaging displays, and the like. The user interface 690 may further include an audio module 692 including hardware components such as a speaker 699 for outputting audio and a microphone 659 for detecting or receiving audio. For example, the speaker 699 can output audio tones or commands to discover an additional electronic device.

Figure 7:
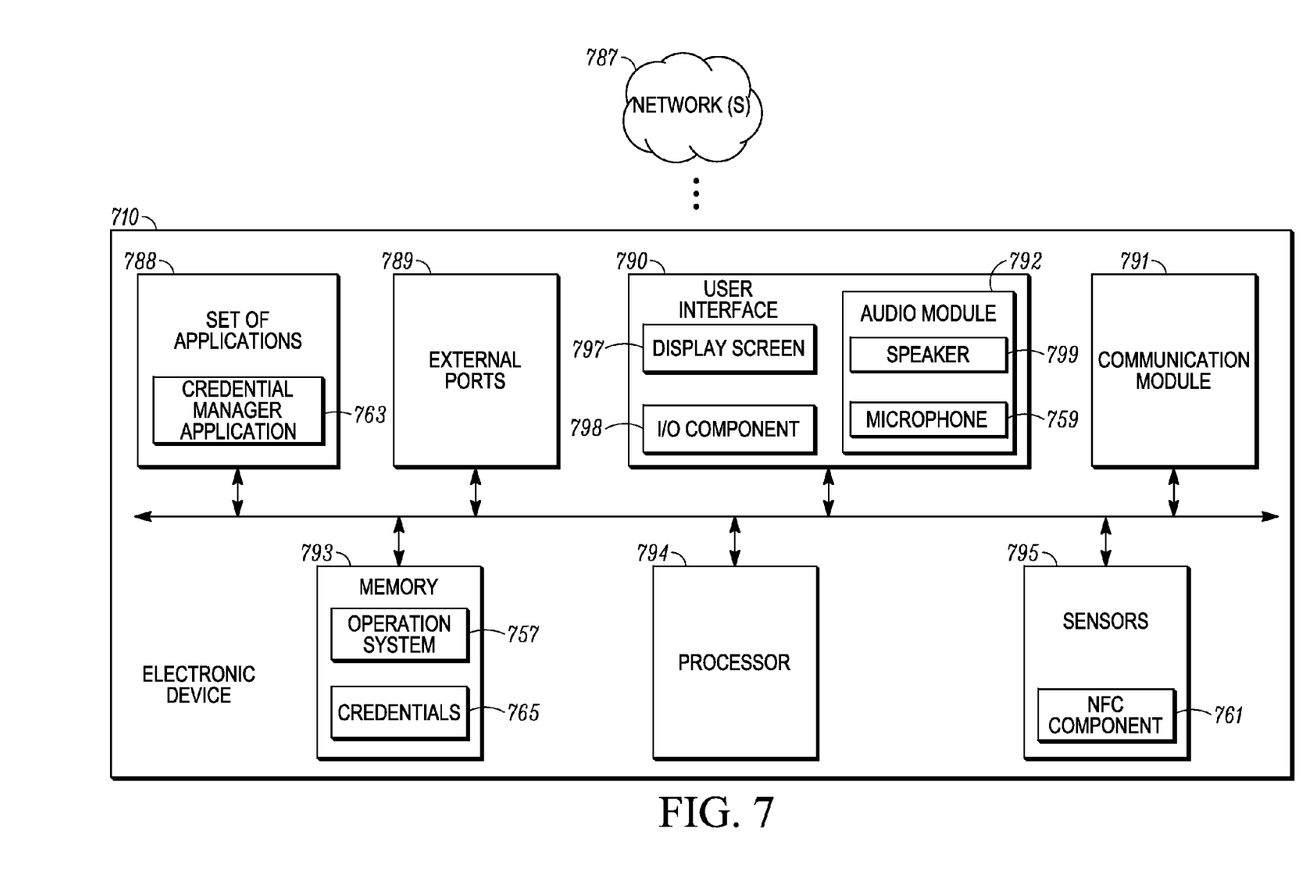

FIG. 7 illustrates an example electronic device 710 (such as the mobile device 110 as discussed with respect to FIG. 1, or other devices) in which the functionalities as discussed herein may be implemented. The electronic device 710 can include a processor 794 or other similar type of controller module or microcontroller, as well as a memory 793. The memory 793 can store an operating system 757 capable of facilitating the functionalities as discussed herein. The memory 793 can also store credentials 765 such as user credentials associated with websites. The processor 794 can interface with the memory 793 to execute the operating system 757 and retrieve the credentials 765, as well as execute a set of applications 788 such as a credential manager application 763 (which the memory 793 can also store). The memory 793 can include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 710 can further include a communication module 791 configured to interface with the one or more external ports 789 to communicate data via one or more networks 787. For example, the communication module 791 can leverage the external ports 789 to establish a personal area network and secure channels associated therewith for connecting the electronic device 710 to other electronic devices such as one shown in FIG. 6. According to some embodiments, the communication module 791 can include one or more transceivers functioning in accordance with IEEE standards, 3GPP standards, or other standards, and configured to receive and transmit data via the one or more external ports 789. More particularly, the communication module 791 can include one or more WLAN and/or WPAN transceivers configured to connect the electronic device 710 to local area networks and/or personal area networks, such as a Bluetooth® network. For example, the electronic device 710 can connect to a browser application of a remote electronic device via a personal area network.

The electronic device 710 can further include one or more sensors 795 such as, for example, imaging sensors, accelerometers, touch sensors, and other sensors, as well as NFC components 761 such as an NFC chip and/or an NFC tag for pairing the electronic device 710 with one or more other electronic devices. The electronic device 710 may include a user interface 790 to present information to the user and/or receive inputs from the user. As shown in FIG. 7, the user interface 790 includes a display screen 797 and I/O components 798 (e.g., capacitive or resistive touch sensitive input panels, keys, buttons, lights, LEDs, cursor control devices, haptic devices, and others). In embodiments, the display screen 797 is a touchscreen display using singular or combinations of display technologies and can include a thin, transparent touch sensor component superimposed upon a display section that is viewable by a user. For example, such displays include capacitive displays, resistive displays, surface acoustic wave (SAW) displays, optical imaging displays, and the like. The user interface 790 may further include an audio module 792 including hardware components such as a speaker 799 for outputting audio and a microphone 759 for detecting or receiving audio. For example, the microphone 759 can detect audio tones or commands used in a discovery routine.

In general, a computer program product in accordance with an embodiment includes a computer usable storage medium (e.g., standard random access memory (RAM), an optical disc, a universal serial bus (USB) drive, or the like) having computer-readable program code embodied therein, wherein the computer-readable program code is adapted to be executed by the processor 694 (e.g., working in connection with the operating system 657) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML, and/or others).

Thus, it should be clear from the preceding disclosure that the systems and methods offer improved credential management techniques. The embodiments advantageously enable the secure storage of user credentials and retrieval of the user credentials by multiple electronic devices. Additionally, the embodiments advantageously facilitate the secure entry of the user credentials into a browser application without the possibility of visual interception by a third party.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. A method on a first electronic device for enabling a user to access a secure website, the method comprising;
   authenticating, using the first electronic device, a user of the first electronic device to a browser application using browser credentials corresponding to a browser account for the user of the first electronic device;
   using the browser application that has been authenticated using the browser credentials corresponding to the browser account to detect navigation to a login page of the secure website, the secure website requiring user credentials for access thereto;
   responsive to detecting navigation to the login page of the secure website, detecting a presence of a mobile device proximal to the first electronic device;
   responsive to detecting the presence of the mobile device being proximal to the first electronic device, authenticating, by a hardware processor of the first electronic device, the first electronic device to the mobile device, wherein authenticating the first electronic device to the mobile device comprises;
      establishing a secure channel between the first electronic device and the mobile device; and
      performing an application layer authentication between the browser application executing on the first electronic device and a credential manager application executing on the mobile device by receiving cryptographic data that includes a cryptographic nonce from the mobile device, hashing the browser credentials with the cryptographic data using a hash function to produce a hashed value, and sending the hashed value to the mobile device, wherein the credential manager application authenticates the browser application using the hashed value;
   responsive to authenticating the first electronic device to the mobile device, sending, to the mobile device via the secure channel, an identification of the secure website;
   responsive to sending the identification of the secure website to the mobile device, receiving via the secure channel, from the credential manager application executing on the mobile device, user credentials based on the identification of the secure website; and
   populating, without user input, the login page of the secure website with the received user credentials.

2. The method of claim 1, wherein detecting the presence of the mobile device comprises:
   receiving a request to retrieve the user credentials;
   responsive to receiving the request, transmitting a discovery signal to the mobile device; and
   receiving, from the mobile device, an acknowledgement signal acknowledging receipt of the discovery signal, wherein authentication of the first electronic device to the mobile device is in response to receiving the acknowledgement signal.

3. The method of claim 2, wherein receiving the request to retrieve the user credentials comprises at least one of:
   detecting a user selection of a credential requirement indicator associated with the login page of the secure website, and
   receiving a user command to initiate communication with the mobile device.

4. The method of claim 1, wherein detecting the presence of the mobile device comprises:
   receiving a credential request from a server associated with the secure website;
   responsive to receiving the credential request, transmitting a discovery signal to the mobile device and
   receiving, from the mobile device, an acknowledgement signal acknowledging receipt of the discovery signal, wherein authentication of the first electronic device to the mobile device is in response to receiving the acknowledgement signal.

5. The method of claim 1, wherein detecting the presence of the mobile device proximal to the first electronic device comprises:
   detecting the presence of the mobile device via a wireless communication.

6. A method in a first electronic device of providing user credentials for access to a secure website, the method comprising:
- detecting a presence of a mobile device proximal to the first electronic device. wherein the first electronic device is executing a credential manager application that stores user credentials required for access to a secure website in which a login page of the secure website has been navigated to using a browser application that is executing on the mobile device and wherein the browser application has been authenticated using browser credentials corresponding to a browser account for a user of the mobile device;
- responsive to detecting the presence of the mobile device being proximal to the first electronic device, authenticating, by a hardware processor of the first electronic device, the first electronic device to the mobile device, wherein authenticating the first electronic device to the mobile device comprises:
  - establishing a secure channel between the first electronic device and the mobile device; and
  - performing an application layer authentication between the browser application executing on the mobile device and the credential manager application executing on the first electronic by transmitting cryptographic data that includes a cryptographic nonce to the mobile device, receiving a hashed value that was produced by hashing the browser credentials with the cryptographic data using a hash function, and using the credential manager application to authenticate the browser application using the hashed value;
- responsive to authenticating the first electronic device to the mobile device, receiving, from the mobile device via the secure channel, an identification of the secure website;
- identifying, by the credential manager application of the first electronic device, the user credentials based on the identification of the secure website; and
- sending the user credentials to the mobile device via the secure channel, wherein the mobile device uses the user credentials with the browser application to access the secure website.

7. The method of claim 6, further comprising:
authenticating the user to the credential manager application of the first electronic device.

8. The method of claim 6, wherein the authenticating, by the hardware processor of the first electronic device, the first electronic device to the mobile device comprises:
authenticating the user of the browser application to the first electronic device.

9. The method of claim 6, wherein detecting the presence of the mobile device comprises:
- receiving a discovery signal from the mobile device; and
- sending an acknowledgement signal to the mobile device acknowledging receipt of the discovery signal, wherein authentication of the first electronic device to the mobile device is in response to receiving the acknowledgement signal.

10. The method of claim 6, wherein detecting the presence of the mobile device proximal to the first electronic device comprises:
detecting the presence of the mobile device via a wireless communication.

11. An electronic device for enabling a user to access a secure website, comprising:
- a memory storing a browser application that has been authenticated using browser credentials corresponding to a browser account and that is configured to detect navigation to a login page of the secure website, the secure website requiring user credentials for access thereto;
- a transceiver that connects to a mobile device; and
- a hardware processor configured to interface with the memory and the transceiver, and to perform operations comprising:
  - authenticating, using the electronic device, a user of the electronic device to the browser application using the browser credentials corresponding to the browser account for the user of the electronic device,
  - responsive to the browser application detecting navigation to the login page of the secure website, detecting a presence of the mobile device proximal to the electronic device,
  - responsive to detecting the presence of the mobile device being proximal to the electronic device, authenticating the electronic device to the mobile device, wherein authenticating the electronic device to the mobile device comprises:
    - establishing a secure channel between the electronic device and the mobile device, and
    - performing an application layer authentication between the browser application executing on the electronic device and a credential manager application executing on the mobile device by receiving cryptographic data that includes a cryptographic nonce from the mobile device, hashing the browser credentials with the cryptographic data using a hash function to produce a hashed value, and sending the hashed value to the mobile device, wherein the credential manager application authenticates the browser application using the hashed value,
  - responsive to authenticating the electronic device to the mobile device, causing a communication module to send, to the mobile device via the secure channel, an identification of the secure website,
  - receiving, from the credential manager application executing on the mobile device via the secure channel, user credentials based on the identification of the secure website, and
  - populating, without user input, the login page of the secure website with the received user credentials.

12. The electronic device of claim 11, wherein the hardware processor detects the presence of the mobile device by:
- receiving a request to retrieve the user credentials,
- responsive to receiving the request, transmitting a discovery signal to the mobile device; and
- receiving, from the mobile device, an acknowledgement signal acknowledging receipt of the discovery signal, wherein authentication of the electronic device to the mobile device is in response to receiving the acknowledgement signal.

13. The electronic device of claim 11, wherein the hardware processor detects the presence of the mobile device by:
detecting the presence of the mobile device via a wireless communication.

* * * * *